United States Patent

Zankl

[15] 3,673,918

[45] July 4, 1972

[54] VIBRATION DAMPENER FOR A MACHINE TOOL

[72] Inventor: Frank Zankl, Milwaukee, Wis.

[73] Assignee: Kearney & Trecker Corporation, West Allis, Wis.

[22] Filed: May 1, 1970

[21] Appl. No.: 33,698

[52] U.S. Cl. .................................. 90/11 R, 308/3 A, 29/1 A
[51] Int. Cl. ...................................................... F16c 21/00
[58] Field of Search ................... 308/3 A, 3; 90/11 R; 29/1 A

[56] References Cited

UNITED STATES PATENTS

| | | | |
|---|---|---|---|
| 3,389,625 | 6/1968 | Wagner | 308/3 A X |
| 2,798,773 | 7/1957 | Walter | 308/3 A |
| 1,285,628 | 11/1918 | Craley | 308/3 |
| 3,020,097 | 2/1962 | Bullard et al. | 308/3 |
| 3,215,474 | 9/1962 | Martin et al. | 308/3 |
| 2,707,659 | 5/1955 | Sloyan | 308/3 |

*Primary Examiner*—Andrew R. Juhasz
*Assistant Examiner*—Z. R. Bilinsky
*Attorney*—Cyril M. Hajewski, William C. Gleisner, Jr. and Donald E. Porter

[57] ABSTRACT

This invention comprises means for adding adjustable dampening to a slidable machine tool member, such as a spindle head, that is secured to a supporting frame member by means of anti-friction bearings. The dampening means are particularly adapted to selectively and adjustably compensate for vibration due to the anti-friction support means in such a manner as to increase both the quality and depth of a particular metal cutting operation by overcoming the tendency to vibration.

7 Claims, 5 Drawing Figures

PATENTED JUL 4 1972

INVENTOR
FRANK ZANKL

BY William C. Gleisner Jr.
ATTORNEY

INVENTOR
FRANK ZANKL
BY William C. Gleisner Jr.
ATTORNEY

VIBRATION DAMPENER FOR A MACHINE TOOL

BACKGROUND OF THE INVENTION

One of the principal purposes of a machine tool is maximum removal of metal in shaping or forming parts to meet manufacturing requirements. In effectively achieving these objectives, the size of the machine tool members, the maximum range of speeds and cutting feeds, and the power available has increased enormously to encompass a much wider range of parts. In addition, the manufacturing requirements both for quantity of metal being removed and quality of the surface finish have increased. To meet the increased standards of requirements, manufacturers of machine tools have greatly increased the size of the various machine tool members and have increased the power available to drive those members for effecting metal cutting operations. Likewise, transmissions are provided having a much greater overall range of driving speeds and anti-friction supports including roller bearings have been provided for supporting the relatively movable machine tool members, such as cutter carrying spindle heads and work supporting tables. As a result of improvements in speed and power available, vibration has become a much bigger problem. As a matter of fact, the vibration resulting from different causes resulted in chatter that interfered with the cutting action of the tools and interfered with the machining operations. The vibration resulted from a wide variety of factors including the cutting action of a rotating tool engaging a workpiece; the rotating gears which effect rotation of the cutter spindle; the motors and hydraulic valves which are associated with the drive trains; also the feed drive train which is provided for moving the spindle head in its path of travel. Actually, a machine tool structure supported by anti-friction bearings is less dampened principally due to its anti-friction mounting. These causes of vibration may occur as single sources of vibration, or may occur in various combinations to provide a vibratory force which directly affects the spindle head and concomitantly the surface finish of the work being machined. In the case of a spindle head mounted for vertical movement on a column, particularly, anti-friction bearings supporting the spindle head for vertical movement have reduced the friction along the supporting column way surfaces. As a result, however, a vibratory force in the spindle head is greatly exaggerated to reduce accuracy and the depth of cut available. The present invention provides an arrangement for effectively dampening vibration in the spindle head without affecting the anti-friction mounting of the spindle head and thereby increasing the metal removing capability.

SUMMARY OF THE INVENTION

According to this invention, there is provided an improved dampening means for a spindle head that is predeterminately adjusted to regulate the frictional pressure between the cooperating guideways of the spindle head and the column guideways supporting the spindle head. This reduces the amplitude of vibration without interfering with the anti-friction mounting between these two members. The adjustable pressure applying members are predeterminately regulated to adjust the frictional pressure applied between the interconnecting ways without impeding slidable movement of the spindle head in its vertical path of travel. In one embodiment of the invention, predetermined frictional pressure is applied mechanically by resilient power exerted by preset Belleville springs and cooperating axially movable friction members resiliently urged to apply frictional pressure against a sliding way. In another embodiment of the invention, unitary hydraulic drive means are connected to predeterminately adjust the frictional force exerted against the sliding way surfaces. The hydraulic pressure control is presettable to adjust the frictional force in direct relation to the lineal feed rate between the cooperating members as they are moved during a machining operation.

It is a general object of the invention to provide a greatly improved frictional mounting for a power driven spindle head to increase the metal removing capabilities.

It is another object of the invention to provide a vibration dampener for slide mounting of the power driven spindle head of a machine tool.

It is another object of the invention to provide improved power actuated friction shoes adapted to selectively compensate for anti-friction supporting means for a power driven machine tool spindle head slide.

A still further object of the invention is to provide an improved frictional control for a power driven spindle head that is operative to reduce vibration and greatly increase the metal removing capability during a cutting operation.

Figure 1:
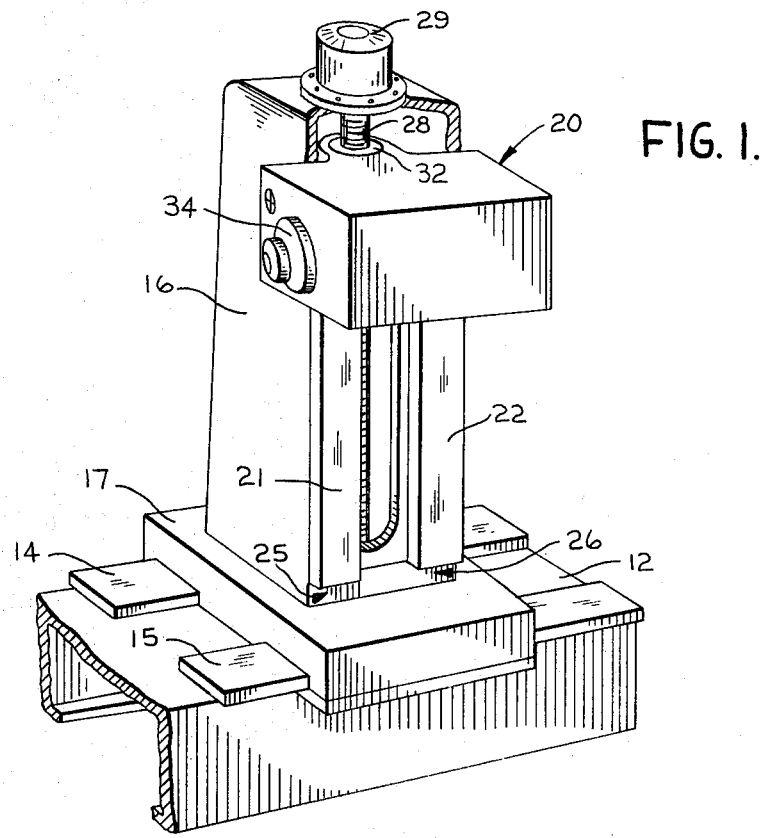
FIG. 1 is a fragmentary view in perspective of a machine tool having a vertical column including a vertically movable spindle head supported on the column, and in which the invention can be applied to advantage.

Referring now to the drawings and more specifically to FIG. 1 thereof, a machine tool incorporating the features of the present invention is there shown in fragmentary perspective form. The machine shown in FIG. 1 comprises essentially a main supporting frame 12 having a pair of horizontal guide ways 14 and 15 spaced in parallelism. A main supporting base 17 is slidably gibbed to the frame guide ways 14 and 15 for selective horizontal movement therealong in response to power driven means (not shown). A vertically upstanding column 16 integrally formed with the base 17 is operative to support a vertically adjustable spindle head 20 carried for selective power driven movement relative to a spaced apart, power driven work support (not shown).

Figure 2:
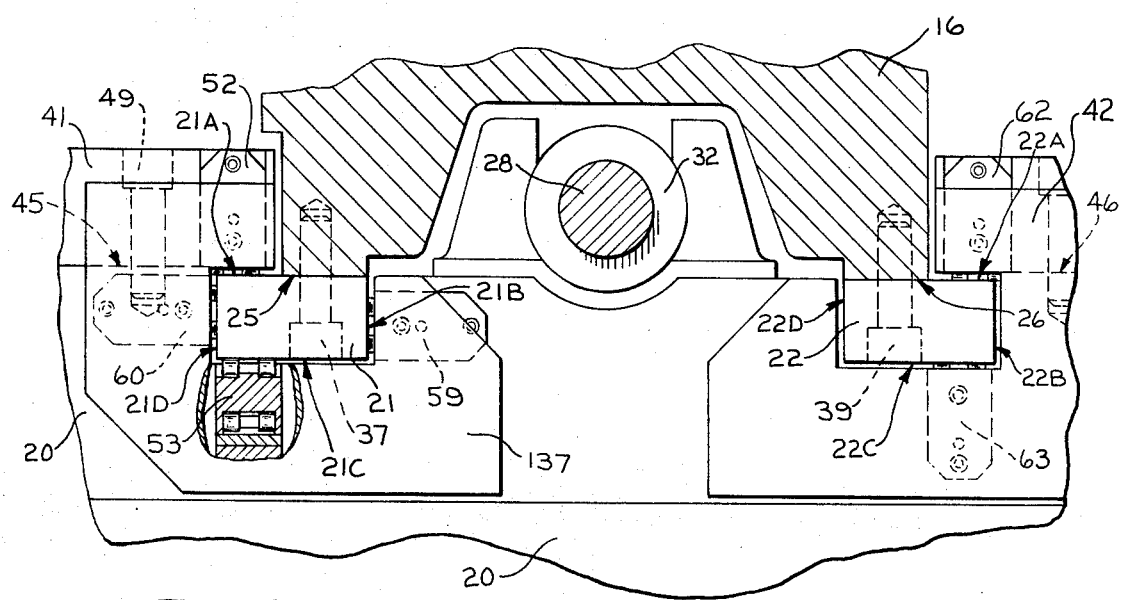
FIG. 2 is an enlarged fragmentary view, taken partly in transverse horizontal section through the column (along the line 2—2 in FIG. 3), and partly in fragmentary front elevation of the spindle head and the cooperating guide bars therefor.
Figure 3:
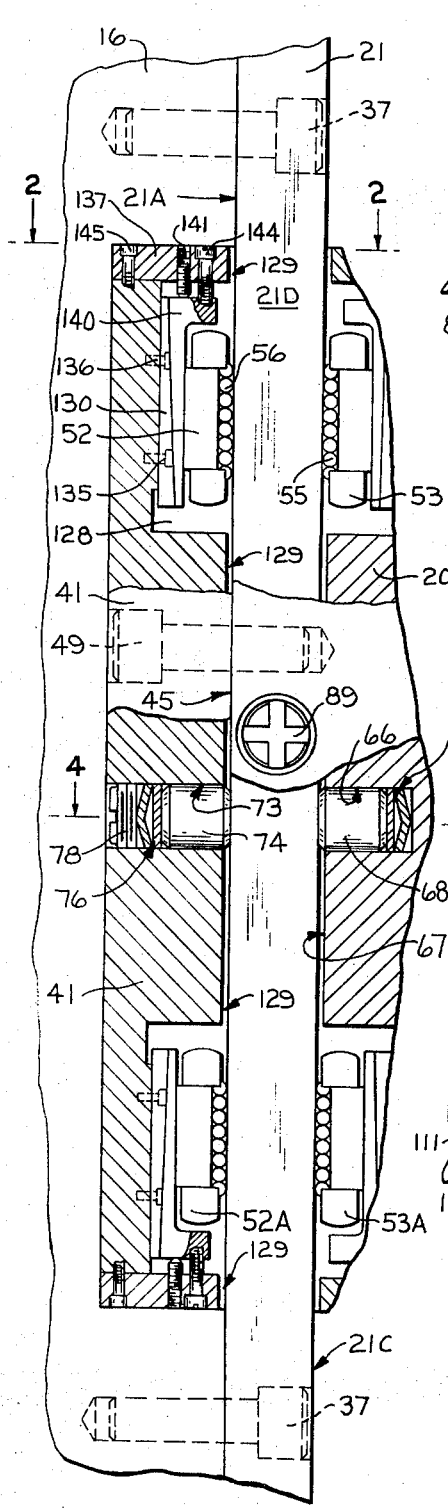
FIG. 3 is an enlarged fragmentary view in front elevation of the vertical column and left column guide way together with an enlarged fragmentary view in front elevation and vertical section through the left guide bar and the spindle head.
Figure 4:
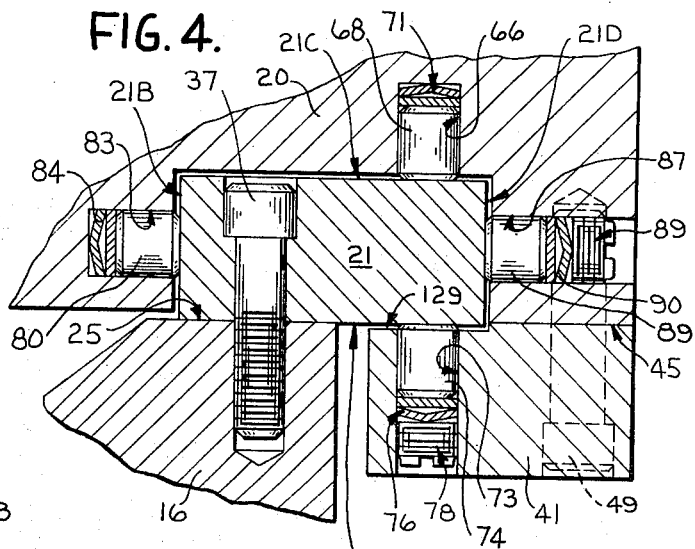
FIG. 4 is an enlarged fragmentary view in horizontal section taken along the line 4—4 in FIG. 3, and showing the resiliently biased friction shoes in elevation and connected to apply pressure from the slidable spindle head to the four faces presented by the left column guide way; and, FIG. 5 is a view in horizontal section illustrating a hydraulically actuated modification of the frictional biasing apparatus illustrated in FIG. 4.

To support the spindle head 20 for vertical movement relative to the frame 12, a pair of spaced apart flanged guide ways 21 and 22 are fixedly secured to the spaced apart front vertical faces 25 and 26 presented by the column 16. As shown in FIGS. 2 to 4 inclusive, the spindle head 20 is connected to the vertical ways 21 and 22 by means of anti-friction, roller bearings to facilitate vertical movement therealong. To maintain the spindle head 20 in slidable engagement for vertical movement along the column ways 21 and 22, spaced apart vertically disposed guide bars 41 and 42 are fixedly secured to flanged rearward edges 45 and 46 presented by the spindle head 20 as illustrated in FIG. 2. A plurality of cap screws, such as 49, extend through vertically spaced apart bored holes in the guide bar 41 to engage correspondingly spaced apart tapped holes in the spindle head flange 45. In a similar manner, a plurality of cap screws, such as 50, respectively extend through a like plurality of vertically spaced apart bored holes in the vertical guide bar 42 to engage correspondingly spaced tapped holes in the spindle head flange 46.

To control vertical movement of the spindle head 20 along the vertical ways 21 and 22, a vertical elevating screw 28 is rotatably journalled in well-known manner in spaced apart bearings (not shown) journalled in the vertical column 16. Actually, as shown in FIG. 1, a feed drive motor 29 fixedly secured to the upper end of the column 16 rotatably supports the upper end of the downwardly depending elevating screw 28 that is supported for rotation at its lower end by a bearing (not shown), journalled in the lower end of the column 16.

As shown in FIGS. 1 and 2, the selectively rotatable elevating screw 28 is adapted to threadedly engage a stationary elevating screw nut 32 fixedly secured against movement within a central portion of the spindle head 20 in known manner. Energization of the motor 29 at a selected rate and direction of movement effects rotation of the elevating screw for effecting corresponding movement of the spindle head 20 at the required directional rate along the vertical column ways 21 and 22.

To effect a desired machining operation on a workpiece carried in a relatively movable work support (not shown) the spindle head 20 is provided with a selectively rotatable, horizontal tool spindle 34. A variable speed, power driven transmission (not shown) is carried within the spindle head 20 for selective operation to drive the tool receiving spindle 34 at a predetermined one of a wide range of spindle speeds. To perform the desired working operation, the rotatable tool spindle 34 supports a cutting tool which is rotatably driven at selective speeds, and moved lineally at a selected feed rate by energization of the vertical drive motor 29.

The resultant metal cutting operation is effected by the coordinate rotation of the metal cutting tool (not shown) carried by the rotating spindle 34 and lineal work feeding movement of the spindle head 20 by energization of the motor 29. To provide maximum operational flexibility, the tool receiving spindle 34 is rotatably driven throughout an extremely wide range of rotational metal cutting speeds. Coordinately therewith, the spindle head 20 is likewise adapted to be lineally moved along the vertical column ways 21 and 22 at a selected one of an extremely wide range of feed rates by energization of the vertical driving motor 29. In addition to the foregoing, movement of the spindle head 20 along the vertical column ways 21 and 22 is facilitated by a plurality of roller bearings which are adjustably gibbed between the spindle head and column ways.

Preferably, as shown in greater detail in FIGS. 2 to 4, the respective ways 21 and 22 are rectangular in cross-section and are secured in flanged relationship to the respective front vertical column faces 25 and 26. As shown in these FIGS. 2 to 4, the left rectangular way 21 is fixedly secured to the left face 25 of the column 16 by a plurality of vertically spaced apart cap screws 37. Only one of the cap screws 37 is respectively shown in FIGS. 2 and 4, while two of the cap screws 37 are illustrated in vertically spaced apart relationship in FIG. 3. As shown in all of these views, it is apparent that each of the vertically spaced apart cap screws 37 extends through spaced apart, bored holes formed in the leftward rectangular guide way 21 and threadedly engage tapped holes in the column 16. The arrangement is such that each rectangular guide way 21 and 22 is so secured to the narrow, spaced apart column faces 25 and 26 presented by the column 16 as to respectively provide four, perpendicularly spaced guiding surfaces. As shown in FIG. 2, the rightward rectangular way 22 is secured in flanged relationship to the relatively narrow rightward column way 26 by a plurality of vertically spaced apart cap screws 39. Although only one of the cap screws is shown in FIG. 2, it is emphasized that a plurality of like screws are extended through a plurality of correspondingly vertically spaced holes in the rightward guide way 22 to engage spaced apart tapped holes presented by the column way 26 of column 16. Only the guide way surfaces 22A and 22C function as rectilinear vertical guides for the spindle head 20.

Referring again to FIGS. 1, 2 and 3, the leftwardly spaced rectangular guide way 21 is provided with four, perpendicularly spaced guide way surfaces respectively identified as 21A, 21B, 21C and 21D. Each of these four separate perpendicular way surfaces is adapted to be guidably engaged by two vertically spaced apart anti-friction roller bearings respectively and adjustably secured within the vertically movable spindle head 20. The general placement of the four upper bearings in the spindle head 20 is illustrated in FIG. 2. As there shown, the rollers presented by the rear bearings 52 are retained in rolling engagement with the flanged way 21A by the guide bar 41 being secured to the vertical spindle head flange 45. It will be apparent that the upper, rear bearing 52 constrains the spindle head 20 against forward movement in opposition to a vertical bearing 53 within the spindle head 20 being maintained in predetermined adjusted engagement with the parallel guide way surface 21C. Anti-friction bearings, such as the bearing 53, are well-known in the art and present a forwardly spaced, lineal row of rollers 55 that are maintained in anti-friction bidirectional rolling engagement with the rectilinear way surface 21C of the rectangular guide way 21. In a similar manner, as shown in FIG. 3, the opposed bearing 52 is so positioned within the left, spindle head guide bar 41 as to maintain the lineal row of recirculating rollers 56 there shown in direct engagement with the rectilinear way 21A of the guide way 21.

As will be explained, each of the roller bearings 52 and 53 is individually adjusted into predetermined rolling engagement with the opposite way surfaces of the column guide way 21. In a similar manner, the transverse opposed way surfaces 21B and 21D of the guide way 21, are respectively engaged by recirculating rollers of bearings 59 and 60 predeterminately positioned within the spindle head 20 as shown in FIG. 2. Four perpendicularly spaced bearings mounted in like parallel relationship to the respective bearings 52, 59, 53 and 60 described in FIG. 2, are positioned in downwardly vertically spaced apart relationship within the spindle head to engage the corresponding ways of left guide way 21. The vertical spacing between the lower bearings and the upper bearings is more clearly illustrated in FIG. 3. As there shown, the downwardly spaced roller bearings 52A and 53A are respectively maintained in rolling, guiding engagement with the respective way surfaces 21A and 21C of the left rectangular guide way 21. In other words, the lower bearings 52A, 53A cooperate with the upper bearings 52, 53 in respectively engaging the parallel, way surfaces 21A, 22C for guidably supporting the spindle head 20 in one plane.

To support the spindle head 20 in the opposite, or transverse plane, another pair of lower bearings (not shown) are transversely positioned in the spindle head in horizontal alignment with the lower spaced apart bearings 52A, 53A. Such a lower pair of bearings (not shown) are positioned in downwardly spaced parallelism relative to the oppositely disposed upper bearings 59, 60 (FIG. 2) in position to engage the corresponding, opposite way faces 21B and 21D respectively. It will be readily apparent that the described, lower pair of bearings (not shown) engage the opposite way surfaces 21B, 21D coordinately with the horizontally aligned lower bearings 52A, 53A engaging the transverse way surfaces 21A, 21C to maintain the spindle head in proper alignment. It will be equally apparent that the lower two pairs of roller bearings described in connection with the bearings 52A, 53A (FIG. 3) cooperate with the upper two pairs of roller bearings described in FIG. 2 to facilitate movement of the spindle head 20 through a wide range of operating feed rates.

With the spindle head 20 guidably constrained in transverse vertical planes along column guide way 21, as described, it is necessary to guide the spindle head in only one parallel plane along the parallel column guide way 22. To this end, the right column guide way 22 is provided with one, parallel pair of way surfaces 22A, 22C that are engaged by two sets of anti-friction, roller bearings in the spindle head 20. In other words, as shown in FIG. 2, the ways 22A and 22C of the right guide way 22 are respectively engaged by rollers respectively presented by an upper pair of anti-friction bearings 62 and 63. The upper bearing 62 is constrained by the right guide bar 42 to forcibly maintain the rollers therein against the way 22A. Simultaneously therewith, adjustable gibs (not shown) within the spindle head 20 position the upper bearing 63 in a manner that the rollers presented thereby are in recirculating engagement with the opposed, parallel way surfaces 22C. Although not shown in the drawings, another pair of roller bearings is downwardly spaced in the spindle head 20 in parallel relationship to the upper bearings 62 and 63. The lower pair of bearings (not shown) cooperate with the upper pair of bearings 62 and 63 in engaging vertically spaced apart portions of the ways 22A and 22C to guide the spindle head 20 along the rectangular guide way 22.

Thus, as hereinbefore explained, two separate vertically spaced apart portions of the rectangular left guide way 21 are each engaged by two pairs of anti-friction bearings respectively carried in correspondingly vertically spaced relationship within the spindle head 20; and, coordinately therewith, two vertically spaced apart portions of the right rectangular guide way 22 are each engaged by one pair of bearings respectively carried in corresponding vertically spaced relationship within the spindle head 20. Thus, there are a total of eight anti-friction bearings supporting the spindle head 20 on the left column 21 in combination with four anti-friction bearings cooperatively supporting the spindle head 20 on the parallel right column 22.

The combined results of the anti-friction bearings described is to greatly facilitate vertical movement and responsiveness of the spindle head 20 in effecting movement of the tool spindle 34 to move a cutter for performing a machining operation. At the same time, the overall range of spindle speeds is increased considerably to provide greatly increased flexibility in operation. Although the described anti-friction bearing mounting for the spindle head 20 increases speed and cutting effectiveness for certain operations, it has the undesirable effect of producing unwanted chatter and vibration that reduce machining effectiveness for certain other machining operations.

The present invention introduces sufficient predetermined frictional control of the spindle head to remove the effects of chatter without interfering with the advantages produced by the anti-friction mounting. The resiliently biased frictional shoes hereinafter described, not only obviates chatter, but more importantly greatly increases the depth of cut available, as well as improves the surface finish of the material being machined.

To accomplish the improved metal cutting, a plurality of bearing shoes are carried within suitable axial openings in the spindle head 20 for exerting a predetermined frictional pressure against the respective way surfaces presented by the left column 21. As is shown in FIG. 3 and 4, a circular, horizontal opening 66 is formed in the central vertical wall 67 of the spindle head 20. An axially movable, frictional bearing shoe 68 is slidably carried within the circular bored opening 66 for resiliently urged axially forward movement in response to a Belleville spring 71. At its inner end, the spring 71 is seated within the inner end of the blind, circular opening 66 in a manner to resiliently urge the bearing shoe 68 axially forward to exert a predetermined frictional force against the vertical face 21C of the left column guide way 21.

In a similar manner, the left spindle head guide bar 41 is provided with a parallel, circular bored opening 73 in parallel alignment with the circular spindle head opening 66 shown in FIG. 3. An opposed circular bearing shoe 74 is slidably mounted in the circular bored opening 73, and is resiliently urged axially inward to exert predetermined frictional pressure against the vertical way 21B. A Belleville spring 76 is, in turn, seated against an adjusting screw 78 that is rotated into predetermined threaded adjustment in the tapped outer end of the bored opening 73.

In a similar manner, the transverse ways 21B and 21D of guide way 21 are respectively engaged by a pair of resiliently biased frictional bearing shoes 80 and 81 respectively. The bearing shoe 80 is axially slidable in a circular, blind bored opening 83 formed directly in the spindle head 20. A Belleville spring 84 seated within the closed or blind, bored opening 83 urges the bearing shoe 80 to exert predetermined frictional pressure against the way 21B during vertical movement of the spindle head 20. Similarly, the circular bearing shoe 81 is carried for axial slidable movement in an oppositely disposed, circular bored opening 87 formed in the spindle head 20 and provided with an outwardly threaded opening adapted to receive a threaded adjusting screw 89. The adjusting screw 89 is operative to selectively compress Belleville spring 90 Thus, during power driven vertical movement of the spindle head 20 along the ways 21 and 22 both bearing shoes 80 and 81 exert resiliently biased frictional pressure against ways 21B and 21D coordinately with the frictional pressure exerted by the shoes 74 and 71 against transverse ways 21A and 21C. The pressure so exerted is sufficient to overcome any vibration due to the anti-friction mounting and thereby greatly increases the effective depth of available cut.

As hereinbefore described, the vertical column 16 has two rectangularly flanged column guideways 21 and 22 respectively secured to its vertical face by a plurality of cap screws 37 and 39, as shown in FIG. 2. As likewise described, the four rectangular faces presented by the left guideway 21 are continuously engaged by eight (8) roller bearings arranged in two vertically spaced apart rows of four (4) roller bearings. The general arrangement for each vertical row of roller bearings is generally similar to the upper vertical row of bearings 52, 59, 53 and 60 described and illustrated in FIG. 2. As shown likewise in FIG. 2, a horizontal cover 137 is releasably secured to the top face of adjacent portions of the head 20 and left guide bar 41 secured thereto. After the guide bar 41 is secured to the head 20, the combined units are adapted to receive the plurality of roller bearings which are initially positioned by the tapered mounting wedges 130 and 140, together with cooperating adjusting screws (not shown). As shown in FIGS. 2 and 3, initial positioning of the bearing 52 is effected by adjusting screws (not shown) and interconnected between the wedges 130 and 140 for initially effecting relative movement between the wedges to position the bearing.

Inasmuch as the positioning of all the bearings associated with both rectangular columns 21 and 22 is accomplished in like manner, it is deemed necessary only to describe the placement of the upper left bearing 52 in detail. As a preliminary, it is reiterated that direct engagement is effected only between the plurality of rollers respectively presented between each of the roller bearings and the respective rectilinear faces of the associated rectilinear way. For example, the rollers 56 of bearing 52 have rolling engagement with the way surface 21A of the guideway 21. After the rollers associated with all of the bearings are in proper rolling engagement with the rectangular ways presented by the two column guideways 21 and 22 shown in FIG. 2, a slight clearance exists adjacent the way surfaces 21A, 21B, 21C and 21D as well as adjacent the way surfaces 22A, 22B, 22C and 22D. As shown in FIGS. 3 and 4, adjacent the vertical wall 21A of guideway 21, the clearance is identified by the reference numeral 129 as being directly adjacent the inner wall of the left column guide bar 41. Positioning adjustment of the roller bearings effects the proper predetermined clearance as indicated.

Initially, as herein before described, the tapered mounting wedge 130 is affixed within the rectangular opening 128 in the guide bar 41, by securing screws 135 and 136 as shown in FIG. 3, directly to the inner wall of the guide bar. Next, the bearing 52 is properly positioned by engagement of the support wedge 140 in position adjacent the mounting wedge 130 to initially position the bearing 52. With all of the bearings positioned, as indicated, and the respective covers secured, the respective bearings are then urged into predetermined tightened position against the various guideway surfaces.

As a preliminary to this, the flat mounting and support cover 137 is fixedly secured to the unitary guide bar and spindle head 20 by plurality of downwardly depending screws 145. After the cover 137 is so secured, the four bearings 52 to 60 inclusive are moved into finally, adjusted position relative thereto. As shown in FIG. 3, the tapered adjusting wedge 140 is urged vertically downward from the underside of the cover 137 by means of adjusting screws 141. After coordinate vertical downward and transverse inward movement of both the tapered wedge 140 and bearing 52, a cap screw 144 is applied through the cover to secure both in selected position.

Figure 5:
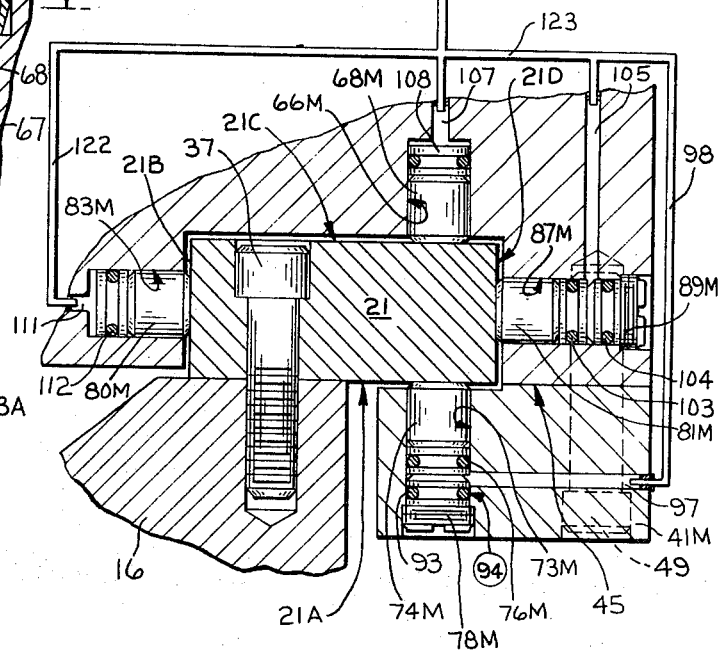

The aspect of the invention illustrated and described in FIGS. 3 and 4 is provided with a plurality of axially movable bearing shoes or plugs that are maintained in resiliently urged, frictionally adjusted positions by the Belleville springs described. In FIG. 5, there is shown a modification of the invention provided with a central hydraulic pressure system 93 adapted to provide a flow of hydraulic pressure fluid to effect predetermined pressure actuation of the bearing shoes. To simplify the drawings, the like parts illustrated in the modification shown in FIG. 5 are identified by like reference numerals followed by the suffix M. In viewing FIG. 5, however, certain of the parts carry the same reference numerals. For example, the left column guideway 21 is illustrated in section as being secured to the column 16 by cap screws 37. The respective way surfaces 21A, 21B, 21C and 21D are frictionally engaged by the respective, axially movable frictional shoes or plugs 74M, 80M, 68M and 81M. The respective friction shoes are respectively mounted in the axially bored openings 73M, 83M, 66M and 87M that are respectively adapted to comprise hydraulic cylinders in the modification of FIG. 5.

As further shown in FIG. 5, the bored opening 73M in the guide bar 41M is provided with an outwardly threaded end that receives an adjusting screw 78M holding an outer pressure piston 93 having a pressure seal 94. The outer piston 93 and adjusting screw 78M limit axial outward movement of an inner piston 95 including a similar adjusting seal to control axial inward pressure actuated movement of the friction plug 74M within the bored opening 73M. A pressure supply line 98 is connected to supply fluid under pressure to a drilled line 97 connected to transmit fluid for urging the inner piston 95 to apply predetermined inward axial pressure against the friction shoe 74M.

In a similar manner, the circular bored opening 87M in the spindle head 20 is provided with an outwardly threaded tapped opening adapted to receive the threaded adjusting screw 89M. An inner piston 103 and an outer piston 104 are predeterminately constrained within the circular bored opening 87M on the opposite sides of a drilled hydraulic supply line 105 by the adjusting screw 89M.

Similar arrangements are provided for hydraulically actuating the frictional shoes 68M and 80M. A drilled hydraulic pressure supply line 107 is connected to transmit pressure fluid directly into the circular bored opening 66M for urging the piston 108 to exert pressure against the friction shoe 68M. In like fashion, a drilled hydraulic supply line 111 transmits pressure fluid into the circular opening 83M to actuate the piston 112 for applying pressure against the friction shoe 80M.

The hydraulic pressure supply system 93 is provided with a motor driven pump 114 that is operative to withdraw pressure fluid from a fluid reservoir 115 in well-known manner. The pump 114, in turn, is connected via a supply line 118, and pressure adjusting valve 119 to transmit fluid under predetermined pressure to a main pressure supply line 120. From the supply line 120, fluid under selected predetermined pressure is transmitted to the transverse branch lines 122, 123 and 98. The respective branch lines transmit fluid under predetermined pressure from the main supply line 120 to the four drilled supply lines 97, 105, 107 and 111 to effect coordinated equalized pressure actuation of the four friction shoes.

As schematically indicated in FIG. 5, a manually operative controller 126 is operatively connected to effect selective actuation of the pressure adjusting valve 119 for selectively varying the pressure of fluid supplied via the main supply line 120. Selective variation of the adjusting valve 126 is operative to selectively vary the pressure available to the main supply line 120 in predetermined relationship to the selected input speed of the tool spindle 34.

It will be readily apparent that the controller 126 can be operated to disconnect the pressure adjusting valve 119 to disconnect the flow of pressure fluid to the main supply line 120. In such a case, no frictional pressure would be exerted by the hydraulically actuatable shoes 66M, 81M, 74M or 80M and the dampening effect available therefrom would be selectively removed from the ways for operation at predetermined speeds and feeds.

Although the illustrative embodiments of the invention have been described in considerable detail to disclose a practical structure, it is understood the particular apparatus described is intended to be illustrative only and that various novel characteristics of the invention may be incorporated in other forms without departing from the spirit and scope of the invention as defined in the subjoined claims.

I claim:

1. In a machine tool adapted to support a spindle head for selective movement to perform a metal cutting machining operation;

a vertical column provided with a plurality of vertical guideways disposed in parallelism;

a cutter carrying a spindle head guidably carried by said vertical column guideways for moving a cutter carried thereby to perform a machining operation;

a plurality of anti-friction bearings adjustably carried by said spindle head in a manner to urge the anti-friction means presented by each bearing transversely into tight rolling engagement with the respectively associated one of said vertical column guideways;

a motorized transmission including rate changing means selectively operative to move said spindle head at a selected feed rate along said column;

friction shoes movably carried by said spindle head for lateral movement relative to an associated column guideway, said friction shoes being constrained by said spindle head against axial movement relative to said associated antifriction bearings, said friction shoes being respectively adapted to exert frictional pressure against an associated one of said vertical column guideways;

variable actuating means connected to urge said friction shoes to exert a selected degree of frictional pressure against said vertical column guideways;

said spindle head being provided with separate tubular openings that each respectively and individually extend transversely to provide an individual opening from said spindle head into an associated one of said column guideways, said tubular guideways being respectively adapted to guidably constrain an associated friction shoe against axial movement relative to an associated one of said antifriction bearings; and resilient means carried at the inner ends of said respective tubular openings being selectively adjusted to resiliently exert the desired frictional pressure of said friction shoes against said associated guideway.

2. In a machine tool having a column provided with a plurality of vertical guideways disposed in parallelism;

a cutter spindle head movably guided by said vertical guideways for vertical movement;

anti-friction roller bearings adjustably secured to said spindle head by gibs selectively adjustable between the respective outer side wall of said spindle head and the rearward face of said respectively associated anti-friction bearing in a manner to forcibly urge said anti-friction bearings respectively presented thereby transversely outward into force exerting rolling engagement with said respectively associated vertical column guideways, said bearings being operative to effect anti-friction rolling engagement between said spindle head and said column guideways;

friction shoes movably carried by said spindle head in positions to exert relatively slidable frictional pressure against said associated vertical column guideways during relative movement of said spindle head along said guideways;

power drive means operative to effect movement of said spindle head along said guideways at a selected feed rate;

separate fluid transmitting means connected to selectively actuate each of said friction plugs for forcibly urging said friction shoes to exert frictional pressure against said associated column guideways;

a remotely positioned source of pressure fluid operatively connected to transmit fluid under pressure via said fluid transmitting means to each of said friction shoes; and a controller connected to selectively adjust the pressure of fluid from said source via said fluid transmitting means to selectively vary the frictional pressure exerted by said friction plugs against said associated vertical column guideways.

3. In a machine tool having a column, said column being provided with a plurality of vertical rectilinear guideways disposed in parallelism;

a cutter carrying spindle head movably guided by said vertical column guideways for vertical movement therealong;

a plurality of anti-friction means carried by said spindle head in a manner to engage an associated one of said vertical guideways of said column to facilitate accurately controlled vertical movement of said spindle head;

power operable means in said column selectively operable to effect directionally controlled movement of said spindle head at a predetermined variable rate relative to said supporting column;

friction shoes carried by said spindle head in fixed vertically spaced relationship to said antifriction means carried thereby, each of said friction shoes being operative to slidably engage a correspondingly associated vertical guideway presented by said column and being transversely movable relative thereto;

hydraulic actuating means selectively operative to urge each of said frictional shoes to exert a predetermined frictional pressure against the respectively associated vertical guideway presented by said column for selectively reducing the amplitude of the oscilatory condition caused by the vibration during power driven metal cutting movement of said spindle head by said power operable means;

an adjusting controller selectively operative to effect a pressure actuated adjustment of said hydraulic actuating means to exert a predetermined pressure actuated adjustment of said frictional shoes; and means for adjusting said controller to selectively disconnect the hydraulic actuating means for completely and selectively removing the dampening effect of said frictional shoes.

4. In a machine tool provided with a plurality of guideways disposed in parallelism;

a cutter spindle head movably guided by said guideways for movement in a specific path of travel;

anti-friction bearings secured to said spindle head in position to engage said guideways for rendering said spindle head movable relative to said guideways;

means for adjustably urging said antifriction bearings into tight rolling engagement with said associated guideways to effect anti-friction rolling engagement between said spindle head and said guideways;

friction shoes movably carried by said spindle head in position to exert frictional pressure against said associated guideways during movement of said spindle head along said guideways to reduce the vibration of said spindle head during such movement;

actuating means operatively connected to forcibly urge said friction shoes to exert a selected frictional pressure against said guideways during feeding movement; and power means operative to effect movement of said spindle head along said guideways at a selected feed rate.

5. In a machine tool according to claim 4 wherein said actuating means for forcibly urging said friction shoes to exert frictional pressure against said associated guideways include separate fluid transmitting means connected to selectively actuate each of said friction shoes;

a remotely positioned source of pressure fluid operatively connected to transmit fluid under pressure via said fluid transmitting means to each of said friction shoes; and a controller connected to selectively adjust the pressure fluid from said source via said fluid transmitting means to selectively vary the frictional pressure exerted by said friction shoes against said associated guideways.

6. In a machine tool according to claim 4 wherein said actuating means comprises resiliently compressible springs operatively connected to effect resiliently biased actuation of said friction shoes to forcibly urge said friction shoes to exert a corresponding resiliently biased frictional pressure against said guideways.

7. In a machine tool according to claim 6 including, adjusting means individually connected and separately operative to effect selectively compressible adjustment of each of said springs to vary the resilient frictional force exerted by each of said friction shoes against said guideways.

* * * * *